US012500813B2

(12) United States Patent
Gruener et al.

(10) Patent No.: US 12,500,813 B2

(45) Date of Patent: Dec. 16, 2025

(54) METHOD AND SYSTEM FOR ANONYMIZATION AND NEGOTIATION FOR PREDICTIVE MAINTENANCE

(71) Applicant: ABB Schweiz AG, Baden (CH)

(72) Inventors: Sten Gruener, Laudenbach (DE); Marie Christin Platenius-Mohr, Hirschberg an der Bergstraße (DE); Anders Trosten, Västerås (SE)

(73) Assignee: ABB Schweiz AG, Baden (CH)

( * ) Notice: Subject to any disclaimer, the term of this patent is extended or adjusted under 35 U.S.C. 154(b) by 175 days.

(21) Appl. No.: 18/332,262

(22) Filed: Jun. 9, 2023

(65) Prior Publication Data

US 2023/0403195 A1 Dec. 14, 2023

(30) Foreign Application Priority Data

Jun. 13, 2022 (EP) .................................... 22178672

(51) Int. Cl.
*H04L 41/0823* (2022.01)
*H04L 41/16* (2022.01)

(52) U.S. Cl.
CPC .......... *H04L 41/0836* (2013.01); *H04L 41/16* (2013.01)

(58) Field of Classification Search
CPC ............................ H04L 41/0836; H04L 41/16
USPC .......................................................... 709/204
See application file for complete search history.

(56) References Cited

U.S. PATENT DOCUMENTS

| | | | |
|---|---|---|---|
| 8,694,646 B1 | 4/2014 | Kothari et al. | |
| 9,235,331 B1 * | 1/2016 | Hegstrand | G06F 3/04842 |
| 10,936,751 B1 | 3/2021 | Scotney et al. | |
| 11,017,123 B1 * | 5/2021 | Salem | H04L 9/0643 |
| 11,086,890 B1 * | 8/2021 | Li | G06F 16/2465 |
| 11,093,641 B1 * | 8/2021 | Whalen | G06F 16/906 |
| 11,501,021 B1 * | 11/2022 | Jensen | G06F 16/282 |
| 11,501,377 B2 * | 11/2022 | Rackley, III | G06Q 30/0645 |
| 11,522,914 B1 * | 12/2022 | Malamut | H04L 63/20 |
| 11,848,943 B2 * | 12/2023 | Adams | G06F 21/604 |

(Continued)

FOREIGN PATENT DOCUMENTS

| | | |
|---|---|---|
| CN | 112219383 A | 1/2021 |
| EP | 3203679 A1 | 8/2017 |

(Continued)

OTHER PUBLICATIONS

Yu et al., "Big Data Analytics in Power Distribution Systems," *2015 IEEE Power & Energy Society Innovative Smart Grid Technologies Conference (ISGT)*, 5 pp. (Feb. 18-20, 2015).

(Continued)

*Primary Examiner* — Tauqir Hussain
(74) *Attorney, Agent, or Firm* — Leydig, Voit & Mayer, Ltd.

(57) ABSTRACT

A method for anonymization and negotiation for predictive maintenance, the method comprising: aggregating, by an aggregation service module, runtime data and/or context data using an aggregation policy to generate aggregated data; anonymizing, by an anonymization module, the aggregated data using a user-definable internal anonymization policy to generate anonymized data; and sending, by a transmitting module, the anonymized data to a condition prediction service module.

14 Claims, 4 Drawing Sheets

(56) References Cited

U.S. PATENT DOCUMENTS

2003/0182422 A1* 9/2003 Bradshaw ........... H04L 41/0894 709/225
2008/0232277 A1* 9/2008 Foo ..................... H04L 12/1822 370/260
2014/0074730 A1* 3/2014 Arensmeier ............. F24F 11/38 705/305
2014/0336791 A1* 11/2014 Asenjo ................. G05B 13/026 700/44
2017/0034581 A1* 2/2017 Short ............... H04N 21/47214
2017/0272472 A1* 9/2017 Adhar ................... G06F 21/602
2017/0295188 A1* 10/2017 David ................... G06F 21/125
2018/0123999 A1* 5/2018 Houri .................... H04L 51/222
2018/0307840 A1* 10/2018 David ................. H04L 63/1441
2018/0316698 A1* 11/2018 David ................. H04L 63/1441
2018/0316699 A1* 11/2018 David ................. H04L 63/1425
2019/0205869 A1* 7/2019 Nair ..................... G06Q 20/383
2019/0372859 A1* 12/2019 Mermoud ........... G06F 21/6245
2020/0242984 A1* 7/2020 Salem ....................... B64B 1/58
2020/0267435 A1* 8/2020 Gordon .............. H04N 21/8586
2021/0089680 A1* 3/2021 Gkoulalas-Divanis ...................... G06F 16/122
2021/0097203 A1* 4/2021 Isoda ................ G06F 16/24556
2021/0352088 A1* 11/2021 Adams .................... G06F 21/44
2022/0121776 A1* 4/2022 Johnston ............... G06F 21/554
2022/0272134 A1* 8/2022 Jain ..................... H04L 65/4015
2023/0275938 A1* 8/2023 Kwatra ............... H04L 65/1093 709/204

FOREIGN PATENT DOCUMENTS

EP 3412000 A1 12/2018
EP 3461054 A1 3/2019
WO WO 2017/134269 A1 8/2017

OTHER PUBLICATIONS

European Patent Office, Extended European Search Report in European Patent Application No. 22178672.6, 12 pp. (Nov. 15, 2022).

* cited by examiner

METHOD AND SYSTEM FOR ANONYMIZATION AND NEGOTIATION FOR PREDICTIVE MAINTENANCE

CROSS-REFERENCE TO RELATED APPLICATIONS

The instant application claims priority to European Patent Application No. 22178672.6, filed on Jun. 13, 2022, which is incorporated herein in its entirety by reference.

FIELD OF THE DISCLOSURE

The present disclosure generally relates to a method and a system for anonymization and negotiation for predictive maintenance. In particular the present invention relates to methods and systems for anonymization of information and parameter negotiation for predictive maintenance.

BACKGROUND OF THE INVENTION

The general background of this disclosure is predictive maintenance. Predictive maintenance applications are typical cross-company applications where different companies exchange data. For example, a plant operator (O) is owning devices and data from the physical plant and from the process these devices are attached to (e.g., temperature, pressure etc.). The device manufacturer or maintenance company (M) has device-specific information from their experience pool (e.g., device fleet analysis across multiple operators) which may help them to identify issues with devices early. Furthermore, typically devices are operated within a technical scope on O's site, e.g. a DCS, which is provided by some automation vendor (A).

Within predictive maintenance applications, the exchanged data is sensitive as each site has reasons for limited trust towards other parties:

O: does not want to expose too much of its process data either to M or A, e.g., due to commercial secrets of production like recipes or production volumes.

M: does not want to expose its device knowledge to others, in order not to lose competitive advantage.

A: as "information broker" between M and O, A is interested in a neutral role and into ensuring trust from M and O.

Current solutions for predictive maintenance suffer from the following flaws:

Disbalance between O's and M's interests, in that:

M gets "unlimited" access to O's operational data on M's devices installed on O's sites, M does not get any access to "context" of its devices, only the "isolated" runtime data of the devices, O gets the "predictive maintenance algorithm" in its physical possession, e.g. as part of device firmware, allowing possibly to tamper and extract it, and/or A has limited control over information flows between components in the system as they are extracted by 3rd party systems and passed outside A's infrastructure, e.g. by using side-channels like embedded 4G/5G modems, Bluetooth connectivity etc.

Fixes to those flaws are currently labor-expensive and error-prone project-specific manual work. For example, the amount and quality of exchanged information needs to be defined in a project specific way. The same holds for the mechanisms of information exchange, i.e., service invocations, authentication, and the definition of the format of the exchanged information.

BRIEF SUMMARY OF THE INVENTION

The systems and methods in accordance with the present disclosure solve the problem of avoiding error-prone project-specific manual work. The present disclosure provides a method and a system for anonymization and negotiation for predictive maintenance and for (de-)anonymization of information and parameter as defined in the appended claims. Further embodiments are provided by the description.

In one aspect of the disclosure, a method for anonymization and negotiation for predictive maintenance is provided, the method comprising the step of: aggregating, by an aggregation service module, runtime data and/or context data using an aggregation policy to generate aggregated data; anonymizing, by use of an anonymization module, the aggregated data using a user-definable internal anonymization policy to generate anonymized data; and sending, by a transmitting module, the anonymized data to a condition prediction service module.

The modules as defined in the present description of the present patent application and in particular the aggregation service module, (de)anonymization module, the condition prediction service module, the quality estimation service module may be a hardware device or a software functionality as also for example a digital service running on an existing device (edge device, controller. In other words, the term "module" as used and defined in the present description of the present patent application may be understood as a building block of a software system that is created during modularization, represents a functionally closed unit and provides a specific service.

The present disclosure advantageously provides predictive maintenance applications for which different companies exchange data e.g. an operator sends device runtime information to the device manufacturer to receive an estimation of device's condition. Currently such interactions need to be set up manually with a limited control of the exchanged information amount. The present disclosure also provides a system for a structured definition of information to be exchanged between companies and anonymization rules applied to this information. The present disclosure advantageously allows users to have a better control of the information which is leaving their organization and having a faster i.e. cheaper setup of condition monitoring infrastructure.

BRIEF DESCRIPTION OF THE SEVERAL VIEWS OF THE DRAWING(S)

In the following, the present disclosure is further described with reference to the enclosed figures.

DETAILED DESCRIPTION OF THE INVENTION

The following embodiments are mere examples for the method and the system disclosed herein and shall not be considered limiting.

Figure 1:
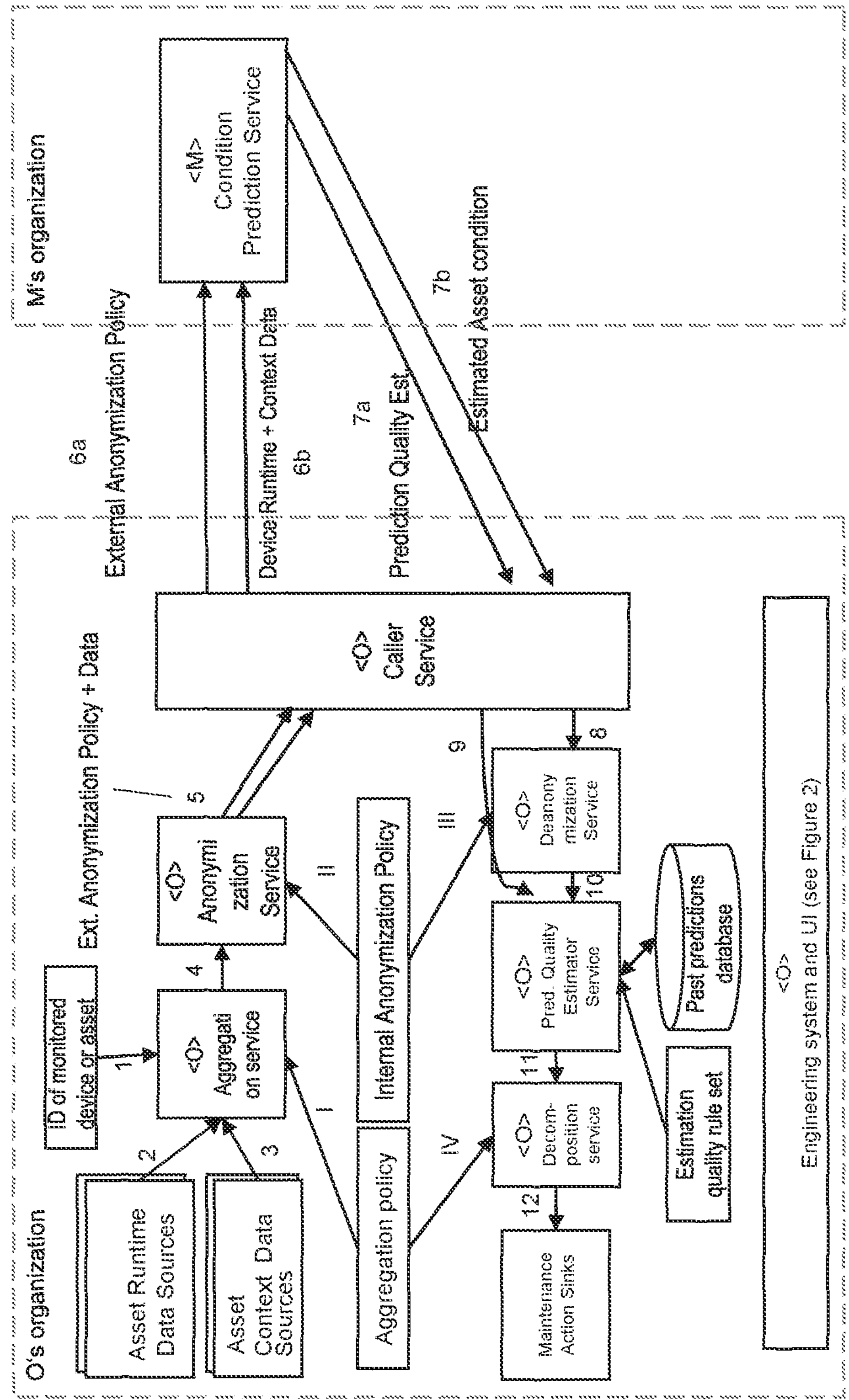
FIG. 1 illustrates a static view of components and schematic information flows and anonymization of condition monitoring information according to an exemplary embodiment of the present disclosure.

FIG. 1 illustrates a static view of components and schematic information flows and anonymization of condition monitoring information according to an exemplary embodiment of the present disclosure. According to an exemplary embodiment of the present disclosure, a set of user-configurable anonymization and deanonymization services is provided allowing to adapt runtime and context data of a monitored asset before this data is passed outside the organization.

According to an exemplary embodiment of the present disclosure, furthermore, structured anonymization rules allow deanonymization of external condition predictions before processing them within the organization.

According to an exemplary embodiment of the present disclosure, the flexibility of the system allows automatic negotiation between organizations to find an optimal tradeoff between the amount and the quality of the shared data with the quality of received predictions as it is expected that the quality/reliability of the prediction declines with the amount of anonymization that is applied to the original data.

According to an exemplary embodiment of the present disclosure, a system for anonymization and negotiation of predictive maintenance data and parameters is provided. This system can typically be executed on an Edge device provided by A and deployed within O's organization (this applies for services marked with "<O>" in FIG. 1). The 3rd party condition prediction service (marked with "<M>" in FIG. 1) does not have to fulfill any deployment requirements and can, e.g., run in M's cloud to ensure confidentiality of included algorithms.

According to an exemplary embodiment of the present disclosure, the cross-company communication between O and M is handled by the Caller Service and Receiver Service on O's site and the Condition Prediction Service on M's side. In order to request a maintenance suggestion, the caller service provides the runtime data (e.g., temperature, vibration, stroke count, current etc.) (arrow 6*b* in FIG. 1) and context data (e.g., its location, its environmental condition like ambient temperature, its physical surroundings (like connection to other device types) of device(s)) (arrow 6*b* in FIG. 1) to the Condition Prediction Service.

According to an exemplary embodiment of the present disclosure, the main output of the Condition Prediction Service is the Estimated Asset Condition (arrow 7*b*) which is received by Caller Service of O and processed further. Technical realization of service interactions is possible using interoperable semantic information containers (e.g., Asset Administration Shell—AAS) and AAS-infrastructure like registries to accomplish discovery of available condition prediction services.

According to an exemplary embodiment of the present disclosure, moving away from central interaction between O and M organizations, let us describe the remaining components and information flows. Before the information about device or other asset's (identification of the asset of interest is transferred via arrow 1 in FIG. 1) can be sent to M, it needs to be aggregated from multiple information sources within O's infrastructure (arrows 2 and 3 in FIG. 1).

According to an exemplary embodiment of the present disclosure, the information sources are manifold, e.g., control systems for current device values, historian systems for historical process values (arrow 2), engineering systems for device context information like its location etc. (arrow 3).

According to an exemplary embodiment of the present disclosure, the aggregation is handled by the Aggregation service which processes the so-called aggregation policy to collect data (arrow I). This policy can be created statically (i.e., once) or dynamically (i.e., during the condition monitoring request) according to pre-defined rules. The static aggregation policy and rules for dynamic aggregation are defined by the user of the system via suitable engineering tools or wizards.

According to an exemplary embodiment of the present disclosure, in the subsequent step, a user-definable internal Anonymization Policy is processed by the Anonymization Service on O's site (I) prior to aggregated device data (arrow 4) leaving the company via the caller service (arrow 6*a*). The anonymization policy is created/configured manually per device/asset instance or in a rule-based fashion based on certain device's properties (e.g., its type and vendor, or its physical location) or machine learning.

According to an exemplary embodiment of the present disclosure, the anonymization policy may contain the following anonymization rules to be applied on exchanged data:

- Value anonymization rules
- Adding noise to the value
- Adding drift
- Changing precision, e.g., rounding, flooring
- Time-delays
- Further parameter based rules
- History-limit rules
- Sending only selected number of latest values of the device
- Reducing sampling rates within the time window Identity anonymization rules
- No or tampered device identification, e.g., random IDs or serials Context anonymization rules related to
- Physical environment of the device (e.g., ambient temperature)+value anonymization
- Device location anonymization
- Tampered topology of device's installation, e.g. modification of the details regarding device neighboring systems and devices, e.g. change or simplify existing piping and electrical signal layout.

An additional aspect of anonymization can involve means of homomorphic encryption allowing the Condition Prediction Service to operate on transmitted encrypted values of Caller Service without decrypting them. In particular, the homomorphic encryption can be applied for Machine Learning systems since a trained model can be broken down in a set of addition and multiplication operations, cf. patent application EP 3412000A1. As therein described, the training and the prediction may take place on encrypted data, which is processed based on homomorphic encryption. Homomorphic encryption provides the possibility that calculations may be based on plaintext data and encrypted data simultaneously. There may be one or more functions mapping a plaintext first data value and an encrypted second data value to an encrypted result data value, which are compatible with the encryption. When the result data value is decrypted, it may have the same value, as when a specific other function, such as addition or multiplication, is applied to the first data value and the encrypted second data value.

According to an exemplary embodiment of the present disclosure, after modifying the runtime and context, the data which is related to the device (arrow 5), is sent to the Condition Prediction Service of another party (arrow 6*b*). The data is complemented by an External Anonymization Policy (arrow 6*a*) which is disclosed to M and might be used to improve or indicate uncertainty in the prediction.

The External Anonymization Policy is not just a copy of the internal one, but again is a partially anonymized reflection of the internal policy. The amount of anonymization information, which is disclosed to the other party, is selected either manually or based on pre-defined rules in a semi-automated fashion.

According to an exemplary embodiment of the present disclosure, the Condition Prediction Service consumes provided runtime and context information including available external anonymization policy via its algorithm.

According to an exemplary embodiment of the present disclosure, based on this information the condition of the device is predicted, e.g. signalizing a normal or an abnormal condition of the device. The prediction (arrow 7*b*) is accomplished by a Prediction Quality Estimation (arrow 7*a*) which the Condition Prediction Service is producing based on the input information and on internal knowledge and will be used in later steps.

According to an exemplary embodiment of the present disclosure, the predicted condition is further processed by O's infrastructure. Here, deanonymization of results is made, if possible, by the Deanonymization Service (arrow 8). This can, for example, include changing the tampered IDs of the device which have been transmitted to M back to its proper internal Identification.

According to an exemplary embodiment of the present disclosure, the exchange is done continuously, e.g., in predefined intervals. In case that non-sufficient quality of the prediction has been indicated externally by the prediction service or detected internally by the Quality Estimation Service based on external quality estimation (arrow 9) and deanonymized prediction data (arrow 10), a specific action can be triggered.

According to an exemplary embodiment of the present disclosure, such actions can be and informing the user and opening a wizard to re-adjust policies, or automatic dynamic negotiation of parameters (described below). The Quality Estimation Service may use a database of previous predictions and set of internal rules to detect insufficient prediction quality.

According to an exemplary embodiment of the present disclosure, based on the Aggregation Policy, the predicted condition of the device a passed to the Decomposition Service (arrow 11), which dispatches the results to one or multiple Maintenance Action Sinks (arrow 12), e.g., operator display or O's maintenance system.

According to an exemplary embodiment of the present disclosure, along with described components, an Engineering System and UI component is part of the systems. The simplified sequence of events when interacting with the engineering system is shown in the following FIG. 2.

Figure 2:
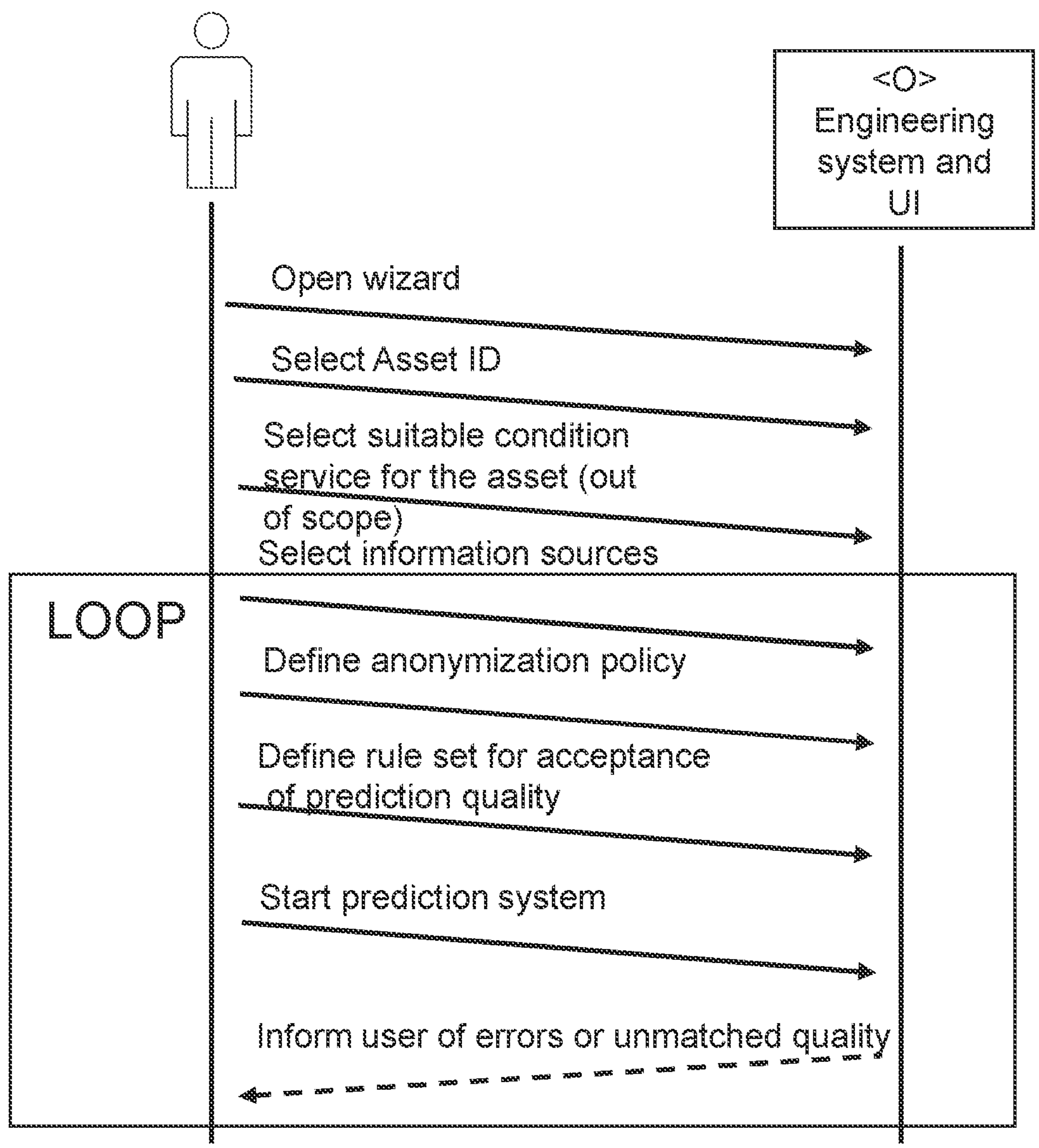
FIG. 2 illustrates an example for interactions between user and the engineering system and UI according to an exemplary embodiment of the present disclosure.

FIG. 2 illustrates an example for interactions between user and the engineering system and UI according to an exemplary embodiment of the present disclosure.

According to an exemplary embodiment of the present disclosure, the initial setup of condition monitoring is performed by a user, e.g., application engineer, interacting with the engineering system, by opening a wizard, selecting the Asset ID (e.g., the serial number of the device) to be monitored.

According to an exemplary embodiment of the present disclosure, the next step is selecting a suitable external Condition Prediction Service which is suitable for the particular device to be monitored.

According to an exemplary embodiment of the present disclosure, the Condition Prediction Service supplies its meta information, e.g., information which needs to be supplied by the Caller Service.

According to an exemplary embodiment of the present disclosure, based on this requested information, the user uses the engineering system to browse available information sources and select the information to be exchanged with M.

According to an exemplary embodiment of the present disclosure, after the information amount is fixed, the anonymization is defined based on the application needs.

According to an exemplary embodiment of the present disclosure, the next step defines the rule set to assess whether the returned prediction suffices the application needs.

According to an exemplary embodiment of the present disclosure, the prediction system is started with this information.

According to an exemplary embodiment of the present disclosure, in case an insufficient prediction quality has been detected by the Prediction Quality Estimation Service, i.e., the acceptance rule set is violated, the user is informed and asked to re-define anonymization policies and/or acceptance rules to either increase the information respectively its quality which is provided to M or to lower the expectations of the received predictions.

According to an exemplary embodiment of the present disclosure, a dynamic negotiation of anonymization policy depending on the prediction quality is performed.

According to an exemplary embodiment of the present disclosure, a possibility to adjust the anonymization policy dynamically is based on prediction quality opens an additional possibility for negotiation and dynamic adjustments of the anonymization policy either during the operation of the system or a-priori, i.e., during the setup if the condition monitoring process.

According to an exemplary embodiment of the present disclosure, based on collected knowledge from previous interactions, the condition prediction service may not only communicate the list of needed information about the asset, e.g. list of required parameters and variables, but also indicate which anonymization might be adequate for each parameter in order to acquire meaningful prediction results.

According to an exemplary embodiment of the present disclosure, such indicators may include, but are not limited to:

- Minimal resolution of information
- Minimal sampling rates of each parameter
- Required non-functional information about the device, e.g., number of hours in operation.

According to an exemplary embodiment of the present disclosure, a table or even a mathematical function may be included in Condition Prediction Service to indicate how the provided quality of information correlates with the prediction result quality, for example: a sampling rate of parameter X and included history of parameter X of at least 60 days will result in 90% prediction accuracy (e.g., in terms the expected F1 score of the classifier).

According to an exemplary embodiment of the present disclosure, the negotiation process itself can again technically be based on industry 4.0 technologies, like the Asset Administration Shell, especially on so-called "Type-3 AAS" interacting using so-called Industry 4.0 language.

Figure 3:
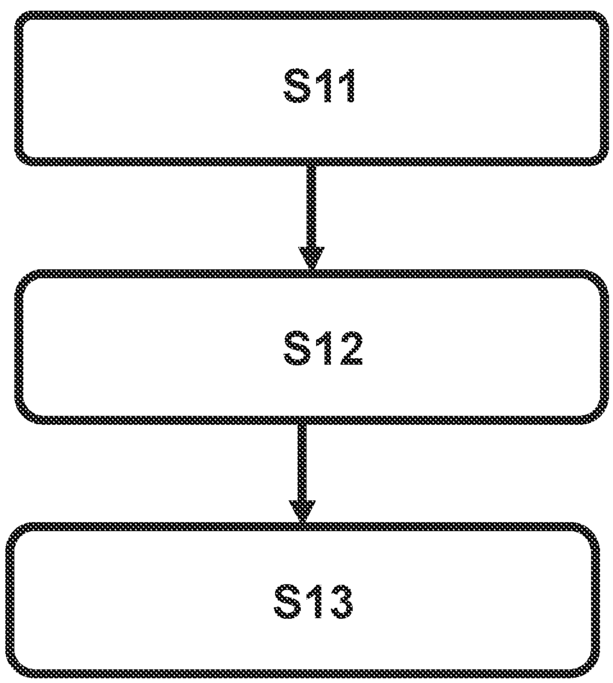
FIG. 3 illustrates a method for anonymization and negotiation for predictive maintenance according to an exemplary embodiment of the present disclosure.

FIG. 3 illustrates a method for anonymization and negotiation for predictive maintenance according to an exemplary embodiment of the present disclosure.

A method for anonymization and negotiation for predictive maintenance comprises at least the following steps: As a first step of the method, aggregating S11, by an aggregation service module 110, runtime data and/or context data is performed using an aggregation policy to generate aggregated data.

As a second step of the method, anonymizing S12, by an anonymization module 120, the aggregated data is performed using a user-definable internal anonymization policy to generate anonymized data. As a third step of the method, sending S13, by a transmitting module 130, the anonymized data to a condition prediction service module 110 is performed.

Figure 4:
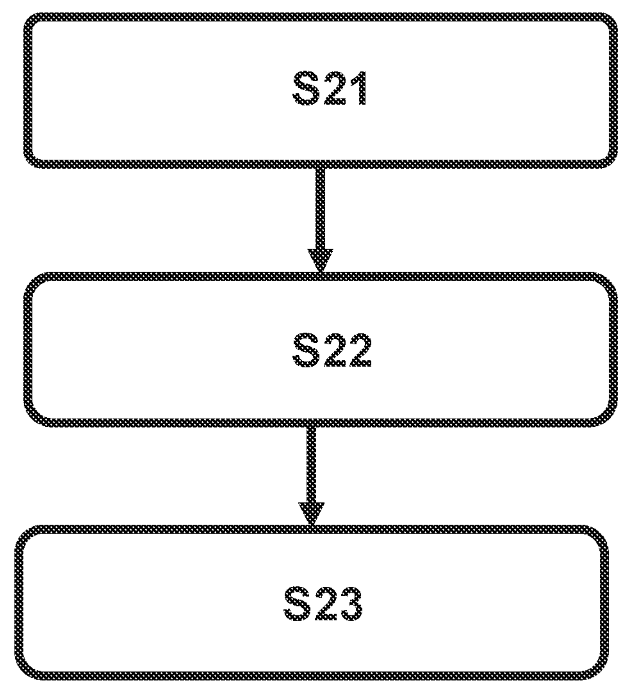
FIG. 4 illustrates a method for deanonymization and negotiation for predictive maintenance according to an exemplary embodiment of the present disclosure.

FIG. 4 illustrates a method for deanonymization and negotiation for predictive maintenance according to an exemplary embodiment of the present disclosure. A method for deanonymization and negotiation for predictive maintenance, the method comprising: As a first step of the method, receiving S21, by a condition prediction service module 210, the anonymized data from a transmitting module 130 is performed. As a second step of the method, deanonymizating S22, by an deanonymization module 220, the received and anonymized data using a user-definable internal deanonymization policy to generate deanonymized data is performed. As a third step of the method, providing S23, by a quality estimation service module 230, prediction service based on the deanonymized data to generate prediction data is performed.

Figure 5:
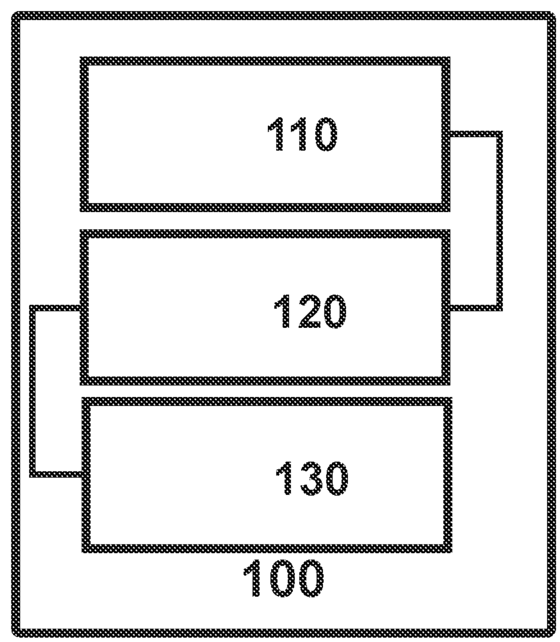
FIG. 5 illustrates a system for anonymization and negotiation for predictive maintenance according to an exemplary embodiment of the present disclosure.

FIG. 5 illustrates a system for anonymization and negotiation for predictive maintenance according to an exemplary embodiment of the present disclosure.

A system 100 for anonymization and negotiation for predictive comprises an aggregation service module 110 configured to aggregate runtime data and/or context data using an aggregation policy to generate aggregated data.

The system 100 for anonymization and negotiation for predictive comprises an anonymization module 120 configured to anonymize the aggregated data using a user-definable internal anonymization policy to generate anonymized data. The system 100 for anonymization and negotiation for predictive comprises a transmitting module 130 configured to send the anonymized data to a condition prediction service module 210.

Figure 6:
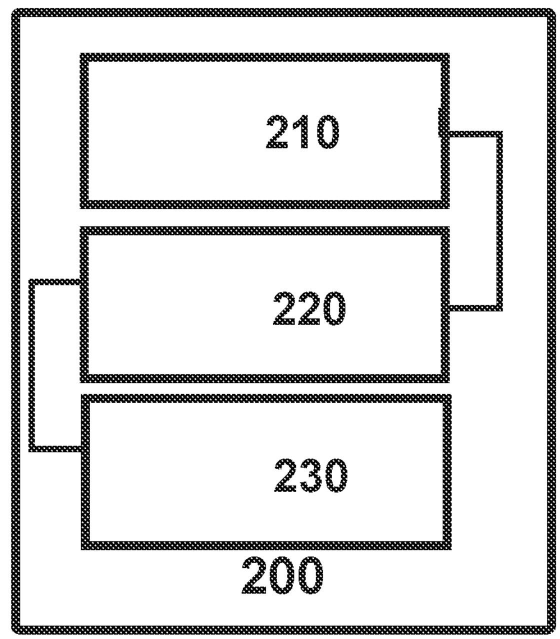
FIG. 6 illustrates a system for deanonymization and negotiation for predictive maintenance according to an exemplary embodiment of the present disclosure.

FIG. 6 illustrates a system for deanonymization and negotiation for predictive maintenance according to an exemplary embodiment of the present disclosure.

A system 200 for deanonymization and negotiation for predictive maintenance comprises a condition prediction service module 210 configured to receive the anonymized data from a transmitting module 130. The system 200 for deanonymization and negotiation for predictive maintenance further comprises an deanonymization module 220 configured to deanonymize the anonymized data using a user-definable internal deanonymization policy to generate deanonymized data.

The system 200 for deanonymization and negotiation for predictive maintenance further comprises a quality estimation service module 230 configured to provide prediction service based on the deanonymized data to generate prediction data.

In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

According to an exemplary embodiment of the present disclosure, the aggregation policy is created statically or dynamically according to pre-defined rules.

According to an exemplary embodiment of the present disclosure, the user-definable internal anonymization policy is configured per device instance and/or asset instance or based on anonymization policy rules based on properties of the device instance and/or asset instance.

According to an exemplary embodiment of the present disclosure, the user-definable internal anonymization policy is configured using machine learning.

According to an exemplary embodiment of the present disclosure, the user-definable internal anonymization policy may contain at least one of the following anonymization rules to be applied on exchanged data: value anonymization rules, history-limit rules, identity anonymization rules, context anonymization rule.

According to an exemplary embodiment of the present disclosure, the method is further comprising the step of adjusting the user-definable internal anonymization policy dynamically.

According to an aspect of the present disclosure, a method for deanonymization and negotiation for predictive maintenance is provided, the method comprising the following steps of receiving, by a condition prediction service module, the anonymized data from a transmitting module; deanonymizating, by an deanonymization module, the received and anonymized data using a user-definable internal deanonymization policy to generate deanonymized data; and providing, by a quality estimation service module, prediction service based on the deanonymized data to generate prediction data.

According to an exemplary embodiment of the present disclosure, the user-definable internal deanonymization policy is configured per device instance and/or asset instance or based on deanonymization policy rules based on properties of the device instance and/or asset instance.

According to an exemplary embodiment of the present disclosure, the user-definable internal deanonymization policy is configured using machine learning.

According to an exemplary embodiment of the present disclosure, the user-definable internal deanonymization policy may contain at least one of the following deanonymization rules to be applied on exchanged data: value deanonymization rules, history-limit rules, identify deanonymization rules, context deanonymization rules.

According to an exemplary embodiment of the present disclosure, the method is further comprising the step of adjusting the user-definable internal deanonymization policy dynamically.

According to an aspect of the present disclosure a system for anonymization and negotiation for predictive maintenance is provided, the system comprising: an aggregation service module configured to aggregate runtime data and/or context data using an aggregation policy to generate aggregated data; an anonymization module configured to anonymize the aggregated data using a user-definable internal anonymization policy to generate anonymized data; and a transmitting module configured to send the anonymized data to a condition prediction service module.

According to an aspect of the present disclosure a system for deanonymization and negotiation for predictive maintenance is provided, the system comprising: a condition prediction service module configured to receive the anonymized data from a transmitting module; an deanonymization module configured to deanonymize the anonymized data using a user-definable internal deanonymization policy to generate deanonymized data; and a quality estimation service module configured to provide prediction service based on the deanonymized data to generate prediction data.

According to an aspect of the present disclosure a network for predictive maintenance is provided, the network comprising the system for anonymization and the system for deanonymization.

Any disclosure and embodiments described herein relate to the method and the system, lined out above and vice versa. Advantageously, the benefits provided by any of the embodiments and examples equally apply to all other embodiments and examples and vice versa.

As used herein "determining" also includes "initiating or causing to determine," "generating" also includes "initiating or causing to generate" and "providing" also includes "initiating or causing to determine, generate, select, send or receive." "Initiating or causing to perform an action" includes any processing signal that triggers a computing device to perform the respective action.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for anonymization and negotiation for predictive maintenance, the method comprising:

aggregating, by use of an aggregation service module, runtime data and/or context data using an aggregation policy to generate aggregated data;

anonymizing, by use of an anonymization module, the aggregated data using a user-definable internal anonymization policy to generate first anonymized data from the aggregated data;

adjusting the user-definable internal anonymization policy dynamically;

anonymizing, by use of the anonymization module, the first anonymized data using an external anonymization policy to generate second anonymized data, wherein the external anonymization policy is disclosed to a condition prediction service module; and sending, by use of a transmitting module, the anonymized data to the condition prediction service module.

2. The method according to claim 1, wherein the aggregation policy is created statically or dynamically according to pre-defined rules.

3. The method according to claim 1, wherein the user-definable internal anonymization policy is configured per device instance and/or asset instance or based on anonymization policy rules based on properties of the device instance and/or asset instance.

4. The method according to claim 1, wherein the user-definable internal anonymization policy is configured using machine learning.

5. The method according to claim 1, wherein the user-definable internal anonymization policy may contain at least one of the following anonymization rules to be applied on exchanged data: value anonymization rules, history-limit rules, identity anonymization rules, context anonymization rule.

6. A method for deanonymization and negotiation for predictive maintenance, the method comprising:

receiving anonymized data from a transmitting module at a condition prediction service module;

deanonymizing, by use of a deanonymization module, the anonymized data using a user-definable internal deanonymization policy to generate deanonymized data, wherein the user-definable internal deanonymization policy is based at least in part on a user-definable internal anonymization policy, and wherein the deanonymized data is encrypted based on homomorphic encryption; and providing, by use of a quality estimation service module, a prediction service based on analyzing plaintext data and the encrypted deanonymized data before decryption of the deanonymized data to generate prediction data.

7. The method according to claim 6, wherein the user-definable internal deanonymization policy is configured per device instance and/or asset instance or based on deanonymization policy rules based on properties of the device instance and/or asset instance.

8. The method according to claim 6, wherein the user-definable internal deanonymization policy is configured using machine learning.

9. The method according to claim 6, wherein the user-definable internal deanonymization policy may contain at least one of the following deanonymization rules to be applied on exchanged data: value deanonymization rules, history-limit rules, identity deanonymization rules, context deanonymization rule.

10. The method according to claim 6, further comprising the step of adjusting the user-definable internal deanonymization policy dynamically.

11. A system for anonymization and negotiation for predictive maintenance the system comprising:
- an aggregation service module configured to aggregate runtime data and/or context data using an aggregation policy to generate aggregated data;
- an anonymization module configured to:
  - anonymize the aggregated data using a user-definable internal anonymization policy to generate first anonymized data from the aggregated data;
  - adjust the user-definable internal anonymization policy dynamically; and
  - anonymize the first anonymized data using an external anonymization policy to generate second anonymized data, wherein the external anonymization policy is disclosed to a condition prediction service module; and
- a transmitting module configured to send the anonymized data to the condition prediction service module.

12. A system for deanonymization and negotiation for predictive maintenance, the system comprising:
- a condition prediction service module configured to receive anonymized data from a transmitting module;
- a deanonymization module configured to deanonymize the anonymized data using a user-definable internal deanonymization policy to generate deanonymized data, wherein the user-definable internal deanonymization policy is based at least in part on a user-definable internal anonymization policy, and wherein the deanonymized data is encrypted based on homomorphic encryption; and
- a quality estimation service module configured to provide a prediction service based on analyzing plaintext data and the encrypted deanonymized data before decryption of the deanonymized data to generate prediction data.

13. The method according to claim 1, wherein sending, by use of a transmitting module, the anonymized data to a condition prediction service module further comprises:
- disclosing, by use of the transmitting module, the external anonymization policy to the condition prediction service module, wherein the external anonymization policy is based at least in part on an anonymization of the user-definable internal anonymization policy.

14. The method according to claim 13, wherein the user-definable internal anonymization policy is not disclosed to the condition prediction service module.

* * * * *